United States Patent
Chi et al.

(10) Patent No.: US 10,268,301 B2
(45) Date of Patent: Apr. 23, 2019

(54) THREE-DIMENSIONAL TOUCH PANEL

(71) Applicant: TPK Touch Solutions (Xiamen) Inc., Xiamen (CN)

(72) Inventors: Ho-Hsun Chi, Hsinchu (TW); Cheng-Chung Chiang, Kaohsiung (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 15/175,049

(22) Filed: Jun. 7, 2016

(65) Prior Publication Data

US 2016/0364057 A1 Dec. 15, 2016

(30) Foreign Application Priority Data

Jun. 10, 2015 (CN) .......................... 2015 1 0314153

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0416* (2013.01); *G06F 2203/04103* (2013.01); *G06F 2203/04105* (2013.01); *G06F 2203/04111* (2013.01)

(58) Field of Classification Search
CPC .... G06F 3/0414; G06F 3/0416; G06F 3/0418; G06F 3/044; G06F 2203/04103; G06F 2203/04105; G06F 2203/04111
See application file for complete search history.

(56) References Cited

U.S. PATENT DOCUMENTS

| | | | | |
|---|---|---|---|---|
| 2016/0098110 A1* | 4/2016 | Choi | ..................... | G06F 3/0416 345/173 |
| 2016/0195955 A1* | 7/2016 | Picciotto | ................. | G06F 3/044 345/174 |
| 2016/0357331 A1* | 12/2016 | Kano | ....................... | G06F 3/044 |
| 2017/0010719 A1* | 1/2017 | Chen | ....................... | G06F 3/044 |
| 2017/0068368 A1* | 3/2017 | Hsiao | .................... | G06F 3/0416 |

* cited by examiner

*Primary Examiner* — Tom V Sheng

(74) *Attorney, Agent, or Firm* — Cooper Legal Group, LLC

(57) ABSTRACT

A touch panel includes a substrate, a first touch sensor electrode, a first insulation structure, a second touch sensor electrode, and a first pressure sensor electrode. The first touch sensor electrode is disposed on the substrate and extends along a first direction. The first insulation structure is dispose on the substrate and covers a part of the first touch sensor electrode. The second touch sensor electrode is disposed on the substrate and extends along a second direction. The second touch sensor electrode crosses over the first insulation structure and electrically isolated from the first touch-sensitive electrode. The first pressure sensor electrode is disposed on the substrate and extends along a third direction. The first pressure sensor electrode crosses over the first insulation structure and is staggered with at least one of the first touch. sensor electrode and the second touch sensor electrode.

20 Claims, 9 Drawing Sheets

THREE-DIMENSIONAL TOUCH PANEL

CROSS-REFERENCE TO RELATED APPLICATION

This application claims priority of Chinese Application No. 201510314153.8, filed on Jun. 10, 2015.

TECHNICAL FIELD

The disclosure relates to a touch panel, and more particularly to a touch panel including a pressure sensor electrode.

BACKGROUND

As technology advances, touch panels have been widely applied to various kinds of consumer electronics, such as portable electronic, products including smart phones, tablet computers, cameras, electronic books, MPEG-1 audio layer-3 (MP3) players, etc., or applied to display screens for operating and controlling equipments.

Currently, some conventional touch panels are equipped with pressure sensor electrodes for detecting a touch pressure value generated by a user's touch. However, the touch sensor electrodes are disposed above or under the pressure sensor electrodes, which is disadvantageous to the requirement for the touch panel to have a thin and lightweight structure in its entirety.

SUMMARY

Therefore, an object of the disclosure is to provide a touch panel including a touch sensor electrode and a pressure sensor electrode that are integrally disposed on the same plane of the same substrate.

Therefore, a touch panel of the disclosure includes a substrate, a first touch sensor electrode, a first insulation structure, a second touch sensor electrode, and a first pressure sensor electrode. The first touch sensor electrode is disposed on the substrate and extends along a first direction. The first insulation structure is dispose on the substrate and covers a part of the first touch sensor electrode. The second touch sensor electrode is disposed on the substrate and extends along a second direction. The second touch sensor electrode crosses over the first insulation structure and the first touch sensor electrode and is staggered with the first touch sensor electrode in an electrically insulating manner. The first pressure sensor electrode is disposed on the substrate and extends along a third direction. The first pressure sensor electrode crosses over the first insulation structure and is staggered with at least one of the first touch sensor electrode and the second touch sensor electrode.

The disclosure have effects as follows: since the pressure sensor electrode and the touch sensor electrode are integrally disposed on the identical plane of the identical substrate, on the one hand, the substrate is saved so that the entire thickness of the touch panel is reduced, and on the other hand, interference between touch-sensing, performance and touch pressure value-sensing performance is avoided, thereby assuring accuracy of touch sensing and pressure value sensing. Moreover, from the viewpoint of the manufacturing process, the pressure sensor electrode and the touch sensor electrode are made from the same material, and thus, the pressure sensor electrode and the touch sensor electrode are made in the same manufacturing step, thereby enhancing production efficiency and economy.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
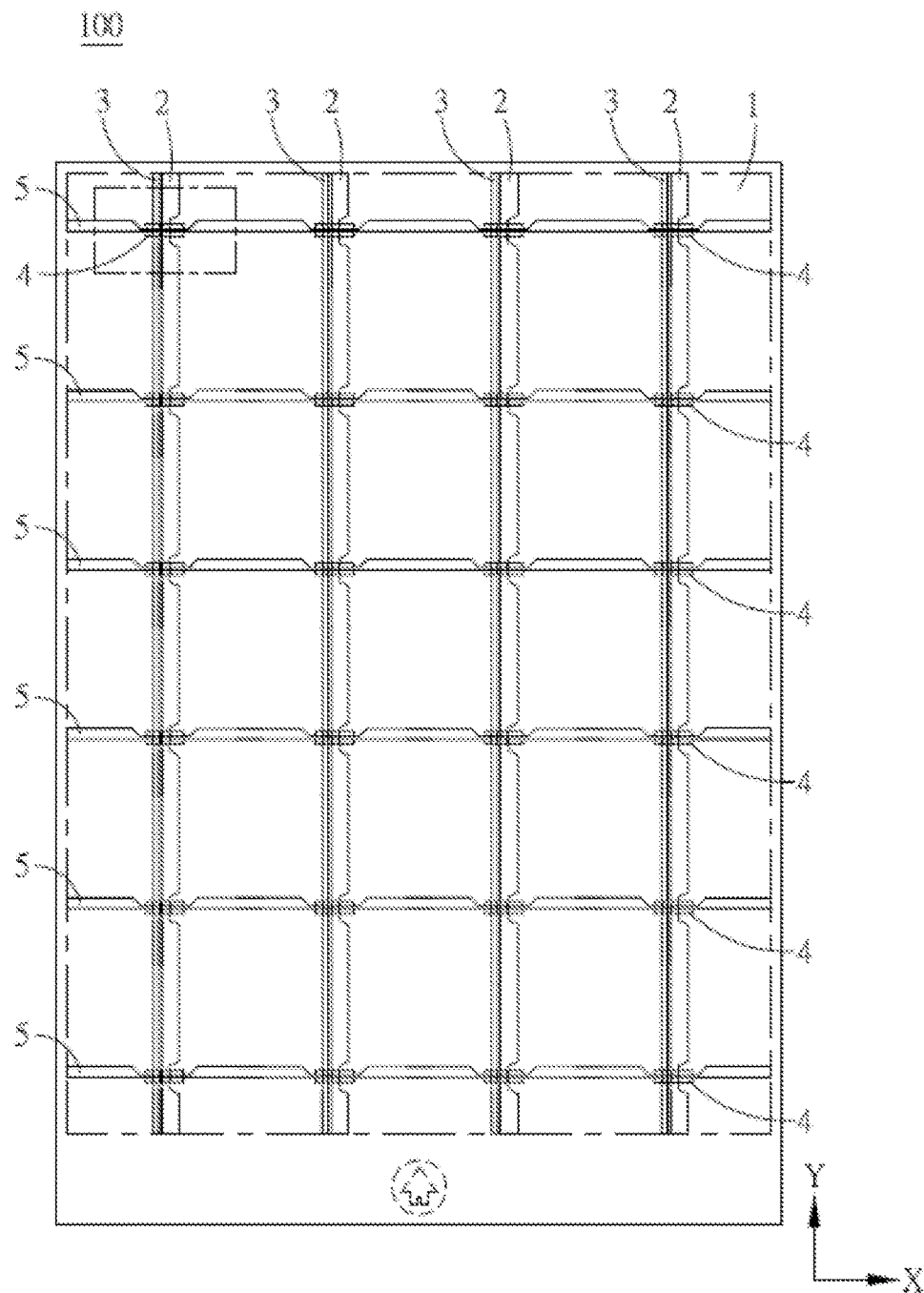
FIG. 1 is a front schematic view, illustrating one or more embodiments of a touch panel of the disclosure.

Before the disclosure is described in greater detail, it should be noted that like elements are denoted by the same reference numerals throughout the disclosure.

Figure 2:
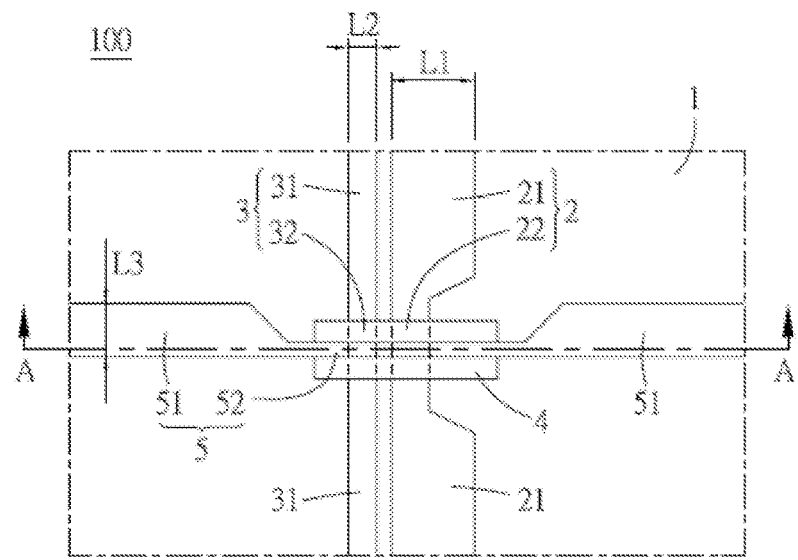
FIG. 2 is a partly enlarged view of FIG. 1.
Figure 3:
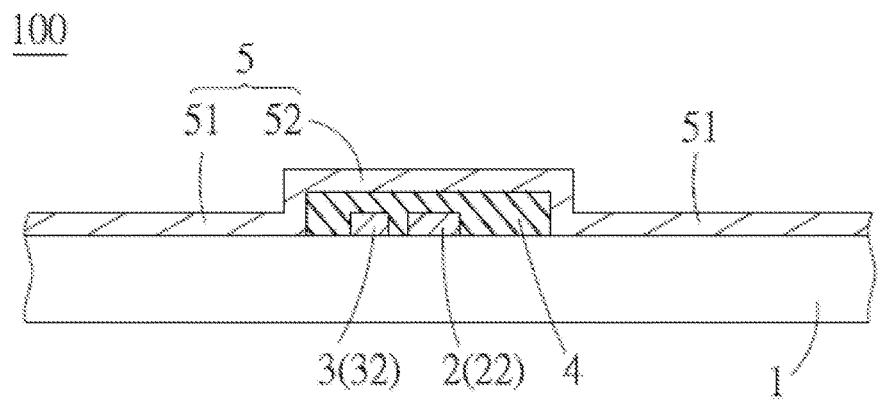
FIG. 3 is a fragmentarily cross-sectional view taken along the line A-A shown in FIG. 2.

Referring to FIGS. 1 to 3, one or more embodiments of a touch panel 100 of the disclosure is illustrated. The touch panel 100 is applied to various kinds of electronic products, such as a mobile phone, a tablet computer, a laptop computer, etc., and includes a substrate 1, a plurality of first touch sensor electrodes 2, a plurality of first pressure sensor electrodes 3, a plurality of first insulation structures 4, a plurality of second touch sensor electrodes 5, and structures not shown in the drawings, including masks, such as black masks(BMs), conductive wires, resistant layers, etc.

The substrate 1 is made of a light-transmitting rigid plate made from glass, etc., or a light-transmitting flexible plate made from polyethylene terephthalate (PET), etc., so as to serve as a carrying substrate for structure production of the touch panel 100.

In some preferred embodiments, the substrate 1 is made from a glass material which has been subjected to a tempering treatment. The tempering treatment is conducted through a special chemical strengthening treatment such that the substrate 1 has a required hardness to prevent from breaking after falling. Moreover, the substrate 1 is designed to serve as a cover plate of the touch panel 100, which is the layer closest to the user. In other words, the substrate 1 has two opposite sides, one of which is adapted to be directly touched by the user to operate the touch panel 100 and the other of which serves as a carrying substrate for structure production of the touch panel 100.

The first touch sensor electrodes 2 are separately disposed on the substrate 1, extend along a first direction corresponding to the Y axis, and are made from a transparent conductive material selected from one of silver nanostructures, metal mesh, indium tin oxide, graphene, carbon nanotubes and a conductive polymer to have an electrode pattern with different shapes, such as a diamond shape, a triangle shape, a rectangle shape, and the like. Thereby, the first touch sensor electrodes 2 are applied to produce touch-sensing signals in the first direction.

In detail, please refer to FIG. 2. Each of the first touch sensor electrodes 2 includes a plurality of spaced-apart first touch-sensing sections 21 and a plurality of first touch-conducting sections 22. Each of the first touch-conducting sections 22 is connected between two adjacent ones of the first touch-sensing sections 21. Each of the first touch-sensing sections 21 is in a position to be spaced apart from the first insulation structures 4 and each of the first touch-conducting sections 22 is superimposed with and covered by a corresponding one of the first insulation structures 4. Thereby, the first touch sensor electrodes 2 and the second touch sensor electrodes 5 are electrically insulated from each other.

The first pressure sensor electrodes 3 are separately disposed on the substrate 1 and extend in a direction that is parallel to the first direction in which the first touch sensor electrodes 2 extend. Each of the first pressure sensor electrodes 3 is arranged to be adjacent to and spaced apart from a corresponding one of the first touch sensor electrodes 2 on the same surface. The first pressure sensor electrodes 3 are made from one of a polymeric material, a conductive material, a piezoelectric material, etc. and may have a change in an electrical property due to structural deformation caused by a touch with an external force. Thereby, a touch sensing function is provided.

In an example of the first pressure sensor electrodes 3 being made from the polymeric material, the first pressure sensor electrodes 3 will have a change in a capacitance due to bending or thickness variation caused by the touch with the external force. From the change in the capacitance, the touch pressure value of the external force is detected so as to provide the touch sensing function.

In an example of the first pressure sensor electrodes 3 being made from the conductive material, the first pressure sensor electrodes 3 will have a change in a cross-sectional area so as to have a change in resistance. Then, the touch pressure value of the external force is determined by detecting the resistance.

In an example of the first pressure sensor electrodes 3 being made from the piezoelectric material, a voltage or current will be generated at the first pressure sensor electrodes 3 due to a direct piezoelectric effect caused by the touch with the external force. Then, the touch pressure value is detected by sensing the voltage or current.

Additionally, in a specific example, the first pressure sensor electrodes 3 are made from the same material, for example, indium tin oxide, as that of the first touch sensor electrodes 2 and the second touch sensor electrodes 5. Thereby, these three electrodes are made at the same time so as to enhance the production efficiency and economy.

Furthermore, in some embodiments, each of the first pressure sensor electrodes 3 includes a plurality of spaced-apart pressure-sensing sections 31 and a plurality of first connection sections 32. Each of the first connection sections 32 is connected between two adjacent ones of the pressure-sensing sections 31. Each of the pressure-sensing sections 31 is in a position to be spaced apart from the first insulation structures 4 and each of the first connection sections 32 is superimposed with and covered by a corresponding one of the first insulation structures 4. Thereby, the first pressure sensor electrodes 3 and the second touch sensor electrodes 5 are electrically insulated from each other. In one preferred configuration, the first pressure sensor electrodes 3 have a width (L2) ranging from about 20 to about 200 nanometers; the first touch sensor electrodes 2 have a width (L1) ranging from about 300 to about 1000 nanometers; and the second touch sensor electrodes 5 have a width (L3) ranging from about nanometers. The widths (L1, L2, L3) are embodied to ensure that the first pressure sensor electrodes 3 have resistances greater than those of the first touch sensor electrodes 2 and the second touch sensor electrodes 5 provided that the first touch sensor electrodes 2, the second touch sensor electrodes 5 and the first pressure sensor electrodes 3 have the same thickness. Consequently, when the user's finger presses one of the first pressure sensor electrodes 3, a corresponding one of the first touch sensor electrodes 2 and a corresponding one of the second touch sensor electrodes 5, the first pressure sensor electrode 3 will be deformed to result in changes in length and a cross-sectional area of the first pressure sensor electrode 3 to generate a strain. From the following formula for calculating the strain gauge of a material, $G=\Delta R/R_0=K_8 \times \varepsilon$, where G is the strain gauge of a material; $\Delta R$ is the change in the change resistance; $R_0$ is the initial resistance of the material; $K_8$ is the sensitivity coefficient of the material; and $\varepsilon$ is the strain at the point to be measured, under the condition that the sensitivity coefficient $K_8$ and the strain $\varepsilon$ remain constant, the greater the initial resistance $R_0$ of the material (such as the first pressure sensor electrode 3), the greater the change of resistance $\Delta R$ is. Thus, the change in the resistance of the material caused by the strain $\Delta R$ to be much easier to be detected by a controller located at a rear end (not shown). Therefore, in some embodiments, by means of adjustment of the widths of the first pressure sensor electrodes 3, the first touch sensor electrodes 2 and the second touch sensor electrodes 5, the resistance of the one of the first pressure sensor electrodes 3 to be touched is greater than those of the corresponding first touch sensor electrode 2 and the corresponding second touch sensor electrode 5. Then, since the change in the resistance $\Delta R$ of the first pressure sensor electrode 3 to be touched is greater than the changes in the resistances $\Delta R$ of the corresponding first touch sensor electrode 2 and the corresponding second touch sensor electrode 5, a preferred sensibility of pressure detection is provided by the one of the first pressure sensor electrode 3 to be touched when pressure sensing is conducted in the touch panel 100, even if a pressure acts on the one of first pressure sensor electrodes 3, the corresponding first touch sensor electrode 2 and the corresponding second touch sensor electrode 5 by the user's finger touch at the same time. Besides, interference caused by the corresponding first touch sensor electrode 2 and the corresponding second touch sensor electrode 5 is avoided. Furthermore, by means of the width (L2) of the first pressure sensor electrodes 3 being smaller than those (L1, L3) of the first touch sensor electrodes 2 and the second touch sensor electrodes 5, the area for detecting the touch position is relatively large so as to ensure a normal touch sensing effect.

It is noted that, in some preferred embodiments, the first pressure sensor electrodes 3 are optionally made from a material having a relatively large initial resistance R0, while the first touch sensor electrodes 2 and the second touch sensor electrodes 5 are optionally made from a material having a small initial resistance R0 relative to that of the first pressure sensor electrodes 3. Thus, when the pressure acts on the one of the first pressure sensor electrodes 3, the corresponding first touch sensor electrode 2 and the corresponding second touch sensor electrode 5 by the user's finger touch at the same time, a preferred sensibility of pressure detection is obtained due to the change in the resistance ΔR of the one of the first pressure sensor electrodes 3 being greater than those of the corresponding first touch sensor electrode 2 and the corresponding second touch sensor electrode 5. Specifically, the first pressure sensor electrodes 3 are made from, but not limited to, indium tin oxide, while the first touch sensor electrodes 2 and the second touch sensor electrodes 5 are made from, but not limited to, silver nanostructures, such as silver nanowires, silver nanoparticles.

The first insulation structures 4 are separately disposed on the substrate 1, cover the first touch-conducting sections 22 of the first touch sensor electrodes 2 and the first connection sections 32 of the first pressure sensor electrodes 3, and are adapted to be respectively crossed thereover by second touch-conducting sections 52 of the second touch sensor electrodes 5. Thereby, the first touch sensor electrodes 2 and the first pressure sensor electrodes 3 are electrically insulated from the second touch sensor electrodes 5.

The second touch sensor electrodes 5 are separately disposed on the substrate 1, extend along a second direction corresponding to the X axis, are made from a material the same as that of the first touch sensor electrodes 2, and are adapted to produce touch-sensing signals in the second direction. In some embodiments, the second touch sensor electrodes S cross over the first insulation structures 4, the first touch sensor electrodes 2 and the first pressure sensor electrodes 3. And the second touch sensor electrodes 5 are staggered with the first touch sensor electrodes 2 and the first pressure sensor electrodes 3 in an electrically insulating manner. The second touch sensor electrodes 5 are cooperative with the first touch sensor electrodes 2 to provide a positioning function when the user touches and operates the touch panel 100.

Specifically, each of the second touch sensor electrodes 5 includes a plurality of spaced-apart second touch-sensing sections 51 and a plurality of the second touch-conducting sections 52 that are connected among the second touch-sensing sections 51. The second touch-sensing sections 51 are substantially located to be separated apart from the first insulation structures 4. Each of the second touch-conducting sections 52 is superimposed on a corresponding one of the first insulation structures 4, so as to form a stacked structure with the corresponding first insulation structure 4, a corresponding one of the first touch-conducting sections 22 and a corresponding one of the first connection sections 32. Based upon the above exemplified arrangement of the first touch sensor electrodes 2, the first pressure sensor electrodes 3, the first insulation structures 4 and the second touch sensor electrodes 5, in some embodiments, the first pressure sensor electrodes 3 performing the pressure-sensing function are integrated with the first touch sensor electrodes 2 and the second touch sensor electrodes 5, both of which perform the touch-sensing function. Thereby, when the touch panel 100 is touched by the user, not only is the touch sensing function provided by the first touch sensor electrodes 2 and the second touch sensor electrodes 5, but measurement of the pressure value generated by the user's touch of the corresponding first pressure sensor electrode 3 is also conducted at the same time.

It is noted that the signals of the above-mentioned touch-sensing and pressure-sensing performances are processed and controlled by the same controller (not shown) in an electrical device in some embodiments, but also are processed and controlled by different controllers in other embodiments, without limitation to that disclosed herein.

Figure 4:
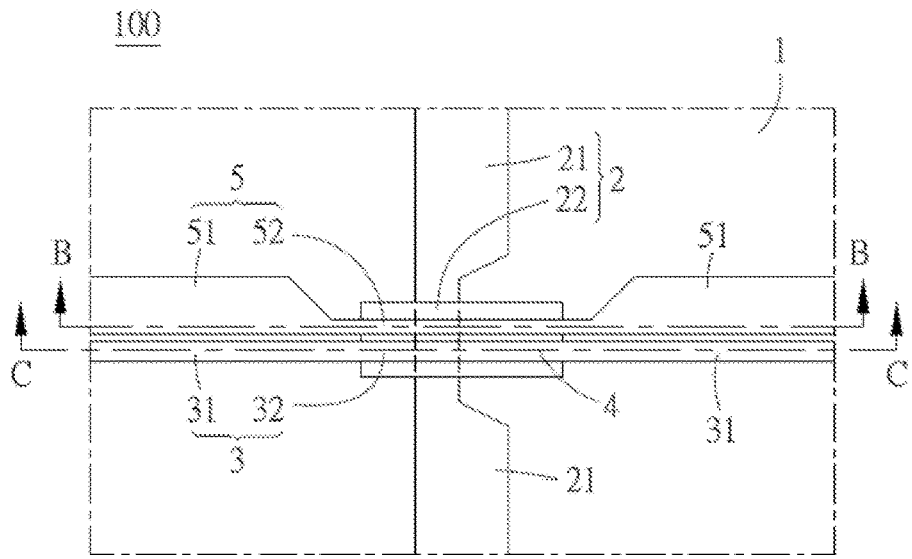
FIG. 4 is a front schematic view, illustrating some embodiments of a touch panel of the disclosure.
Figure 5:
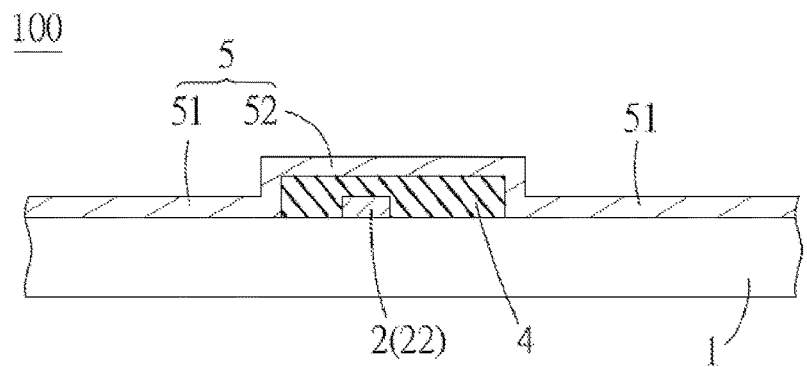
FIG. 5 is a fragmentarily cross-sectional view taken along the line B-B shown in FIG. 4.
Figure 6:
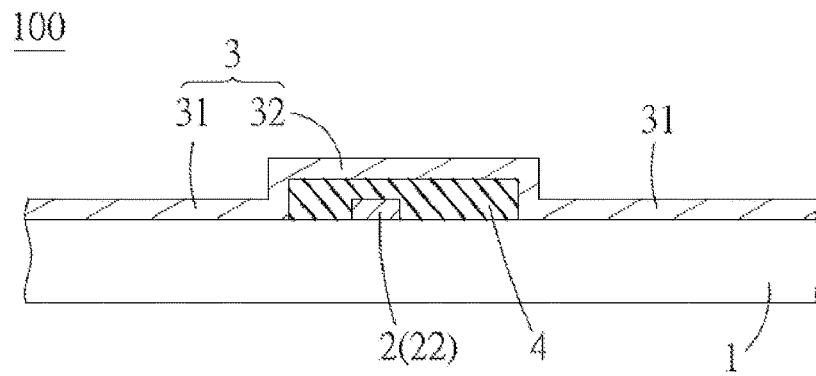
FIG. 6 is a fragmentarily cross-sectional view along the line C-C shown in FIG. 4.

Referring to FIGS. 4, 5, and 6, some embodiments of the touch panel 100 of the disclosure are illustrated. Compared with FIGS. 1, 2, and 3, the first pressure sensor electrodes 3 of FIGS. 4, 5, and 6 extend along the third direction that is the same as the second direction of the second touch sensor electrodes 5 and are separated from and alternate with the second touch sensor electrodes 5. Furthermore, the second touch sensor electrodes 5 respectively cross over the first insulation structures 4 and the first touch sensor electrodes 2 and are staggered with the first touch sensor electrodes 2 in an electrically insulating manner. Thus, the first pressure sensor electrodes 3, which extend along the second direction, are also integrated with the first touch sensor electrodes 2 and the second touch sensor electrodes 5 that perform touch-sensing function. Thereby, when the touch panel 100 is touched by a user, detection of the touch operation and detection of the pressure value of the touch operation are carried out at the same time.

Figure 7:
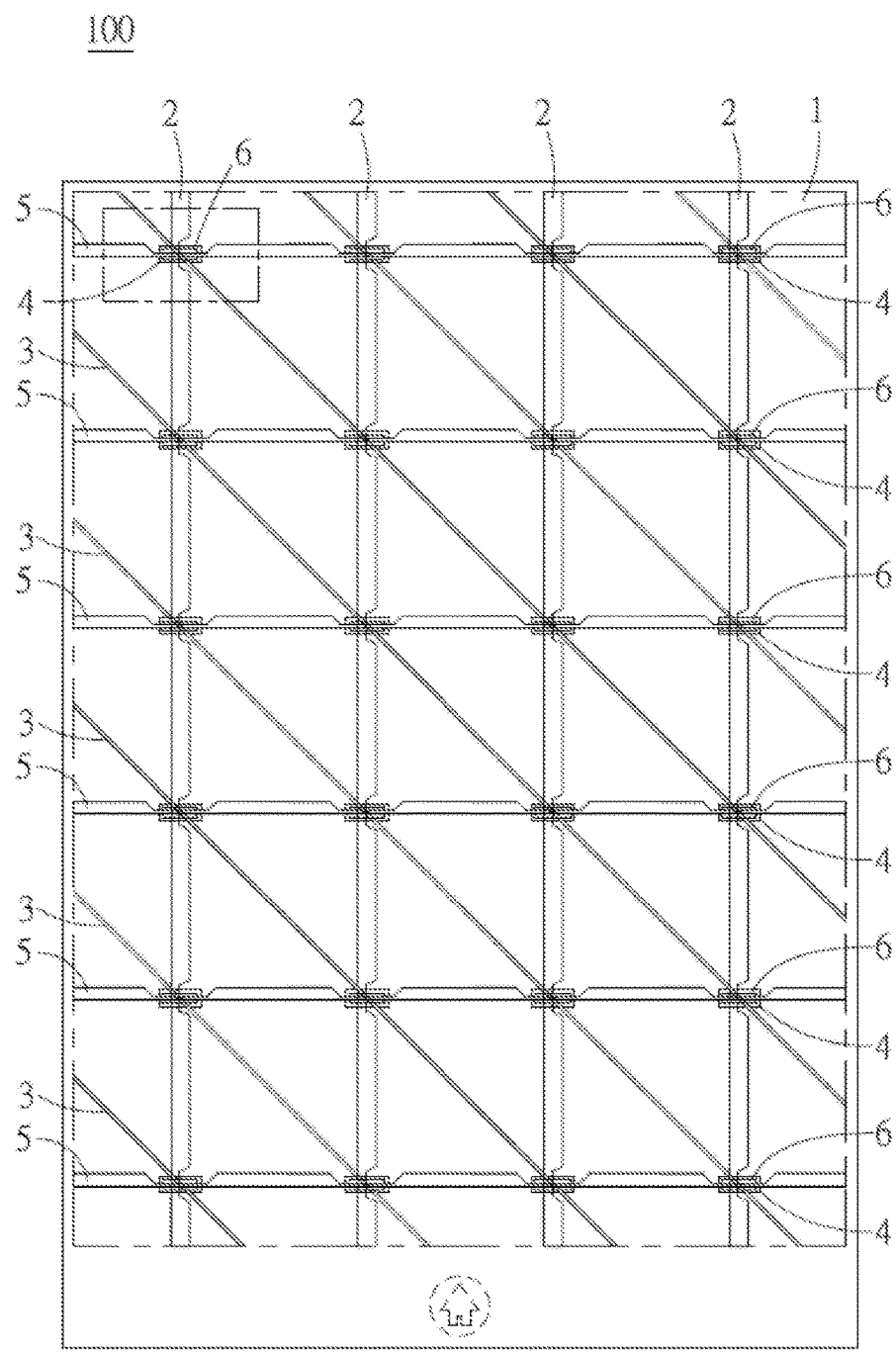
FIG. 7 is a front schematic view, illustrating some embodiments of a touch panel of the disclosure.
Figure 8:
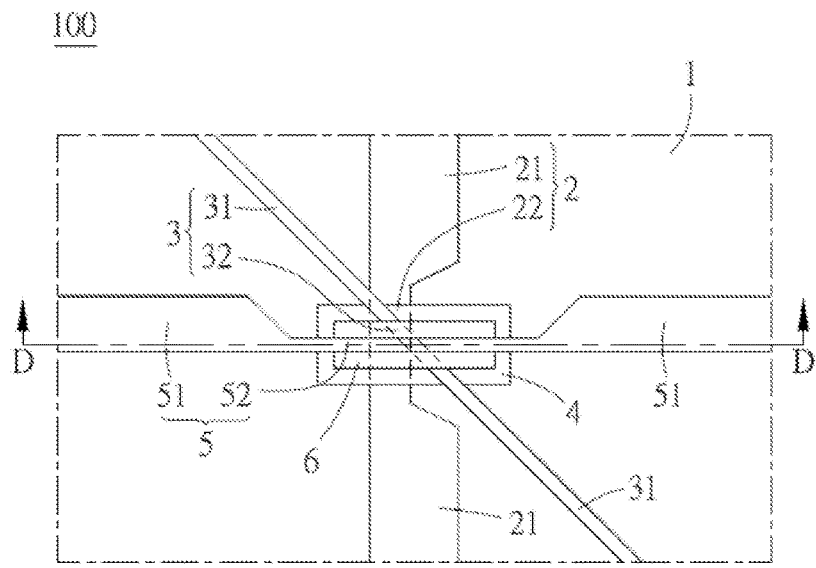
FIG. 8 is a partly enlarged view shown in FIG. 7.
Figure 9:
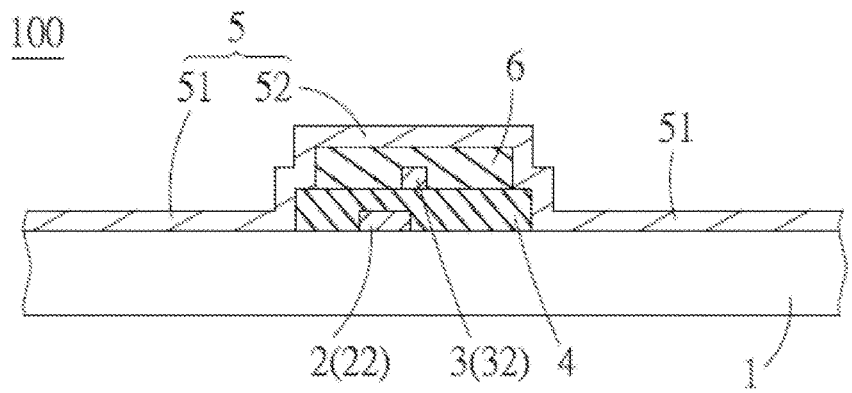
FIG. 9 is a fragmentarily cross-sectional view taken along the line D-D shown in FIG. 8.

Referring to FIGS. 7, 8 and 9, the touch panel 100 of the disclosure is illustrated in accordance with some embodiments. The first pressure sensor electrodes 3 extends along a third direction which is different from the first and second directions. That is to say, the extension direction of the first pressure sensor electrodes 3 is different from the extension directions of the first touch sensor electrodes 2 and the second touch sensor electrodes 5. Furthermore, each of the first touch sensor electrodes 2, a corresponding one of the first pressure sensor electrodes 3, and a corresponding one of the second touch sensor electrodes are staggered with each other at a corresponding one of the first insulation structures 4 so as to have a structure different from those of FIGS. 1 to 6.

In some embodiments, the touch panel 100 further includes a plurality of second insulation structures 6. Each of the second insulation structures 6 is in position to be superimposed with and spaced apart from a corresponding one of the first insulation structures 4. Each of the first touch sensor electrodes 2 and the corresponding first pressure sensor electrode 3 sandwich a corresponding first insulation structure 4 therebetween and are electrically insulated from each other through the corresponding first insulation structure 4. Each of the first pressure sensor electrodes 3 and the corresponding second touch sensor electrode 5 sandwich a corresponding second insulation structure 6 therebetween and are electrically insulated from each other through the corresponding second insulation structure 6.

Specifically, referring back to FIG. 9, for a staggered configuration including one of the first touch sensor electrodes 2, the corresponding first pressure sensor electrode 3 and the corresponding second touch sensor electrode 5, in a bottom-to-top direction, the one of the first touch sensor electrodes 2, the corresponding first insulation structure 4, the corresponding first pressure sensor electrode 3, the corresponding second insulation structure 6 and the corresponding second touch sensor electrode 5 are superimposed with each other to form a stacked structure. Thereby, when the touch panel 100 is touched by a user, the touch-sensing and the pressure-sensing functions are provided at the same time. It is noted that the structural relationship of the above-mentioned stacked structure among the one of the first touch sensor electrodes 2, the corresponding first insulation structure 4, the corresponding first pressure sensor electrode 3, the corresponding second insulation structure 6, and the corresponding second touch sensor electrode 5 is provided only for exemplification, and manufacturers may modify the order of the first touch sensor electrode 2. the first pressure sensor electrode 3 and the second touch sensor electrode 5 in the above staggered configuration depending upon any intended requirement or specification without any limitation.

In sum, in the touch panel 100 of the disclosure, the first pressure sensor electrodes 3, the first touch sensor electrodes 2, and the second touch sensor electrodes 5 are integrally disposed on the same surface of the substrate 1. On the one hand, the substrate 1 is used in an economic way so as to reduce the entire thickness of the touch panel 100. On the other hand, by virtue of placement of the first pressure sensor electrodes 3, the first touch sensor electrodes 2, and the second touch sensor electrodes 5 on the same surface of the substrate 1, interference between touch-sensing performance and touch pressure value-sensing performance of the touch panel 100 is avoided, thereby assuring accuracy of touch sensing and pressure value sensing.

Figure 10:
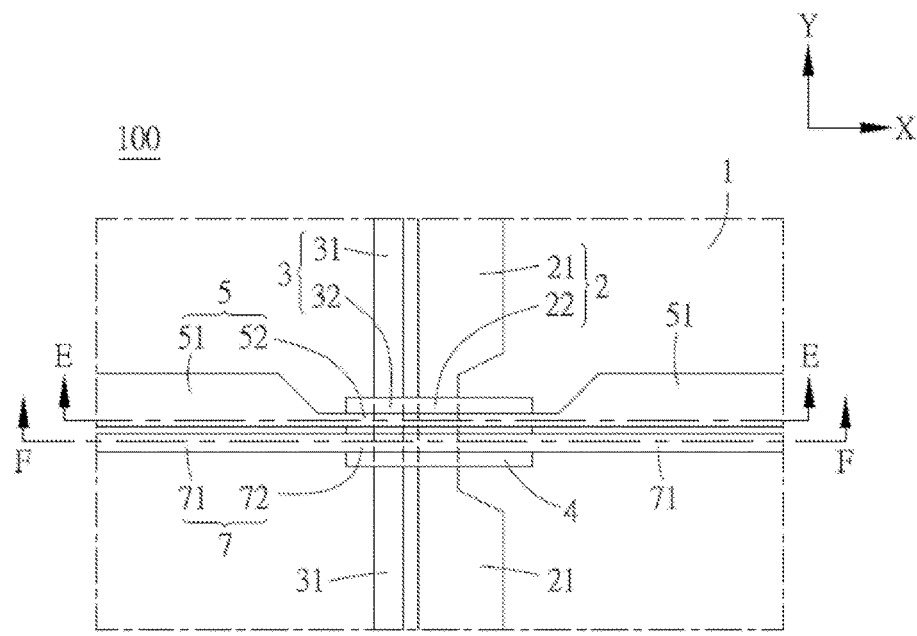
FIG. 10 is a front schematic view, illustrating some embodiments of a touch panel of the disclosure.
Figure 11:
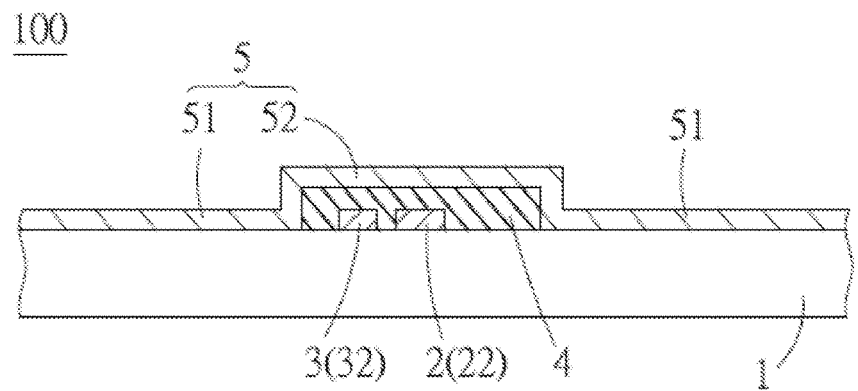
FIG. 11 is a fragmentarily cross-sectional view taken along the line E-E shown in FIG. 10.
Figure 12:
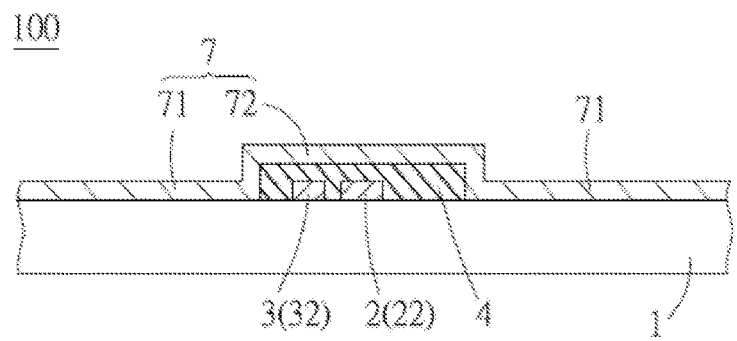
FIG. 12 is a fragmentarily cross-sectional view taken along the line F-F shown in FIG. 10.

Referring to FIGS. 10, 11 and 12, the touch panel 100 in accordance with at least one embodiment of the disclosure is illustrated. Compared with FIGS. 1 to 9, the touch panel 100 further includes a plurality of second pressure sensor electrodes 7 (only one is shown). The second pressure sensor electrodes 7 are disposed on the substrate 1, extend along a fourth direction and are separated from and alternate with the second touch sensor electrodes 5. In some embodiments, the fourth direction is the same as the second direction. Furthermore, the second pressure sensor electrodes 7 respectively cross over the first insulation structures 4, the first touch sensor electrodes 2 and the first pressure sensor electrodes 3 and are staggered with the first touch sensor electrodes 2 and the first pressure sensor electrodes 3 in an electrically insulating manner.

Specifically, the second pressure sensor electrodes 7 are made from a material the same as that of the first pressure sensor electrodes 3, and have a preferred width substantially the same as that of the first pressure sensor electrodes 3 so as to detect the pressure value of the user's touch in the second direction. Each of the second pressure sensor electrodes 7 includes a plurality of separate second pressure-sensing sections 71 and a plurality of spaced apart second connection sections 72 that are connected among the second pressure-sensing sections 71. The second pressure-sensing sections 71 are generally located to be separated apart from the first insulation structures 4, and each of the second connection sections 72 is superimposed on a corresponding one of the first insulation structures 4, such that the second pressure sensor electrode 7 is electrically insulated from a corresponding one of first touch sensor electrodes 2 and a corresponding one of the first pressure sensor electrodes 3.

Based on FIGS. 10, 11, and 12, in the touch panel 100 of the disclosure, the first pressure sensor electrodes 3, the second pressure sensor electrodes 7, the first touch sensor electrodes 2, and the second touch sensor electrodes 5 are integrally disposed on the same surface of the substrate 1. On the one hand, the substrate 1 is used in an economic way so as to reduce the entire thickness of the touch panel 100. On the other hand, by virtue of placement of the first pressure sensor electrodes 3, the second pressure sensor electrodes 7, the first touch sensor electrodes 2, and the second touch sensor electrodes 5 on the same surface of the substrate 1, interference between touch-sensing performance and touch pressure value-sensing performance of the touch panel 100 is avoided, thereby assuring accuracy of touch sensing and pressure value sensing. Besides, compared with FIGS. 1 to 9, by means of the staggered arrangement of the first pressure sensor electrodes 3 and the second pressure sensor electrodes 7, other than providing a more accurate pressure-sensing function, when the user touches the touch panel 100, positioning detection of the user's touch position is carried out by the first pressure sensor electrodes 3 and the second pressure sensor electrodes 7 so as to provide a positioning function in addition to that provided by the first touch sensor electrodes 2 and the second touch sensor electrodes 5. Thereby, the user can perform more diversified operations.

Figure 13:
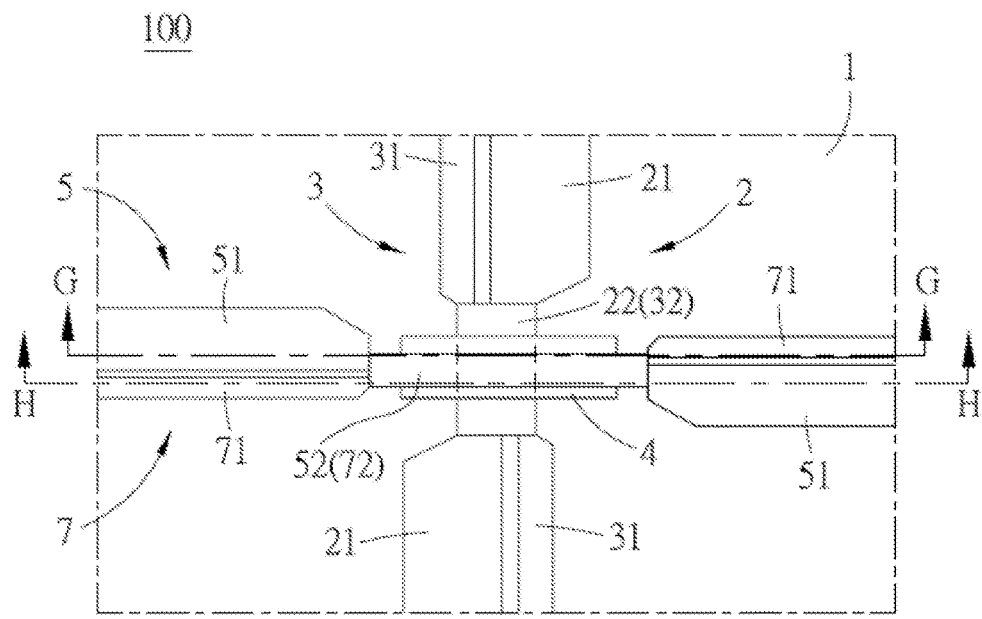
FIG. 13 is a front schematic view, illustrating some embodiments of a touch panel of the disclosure.
Figure 14:
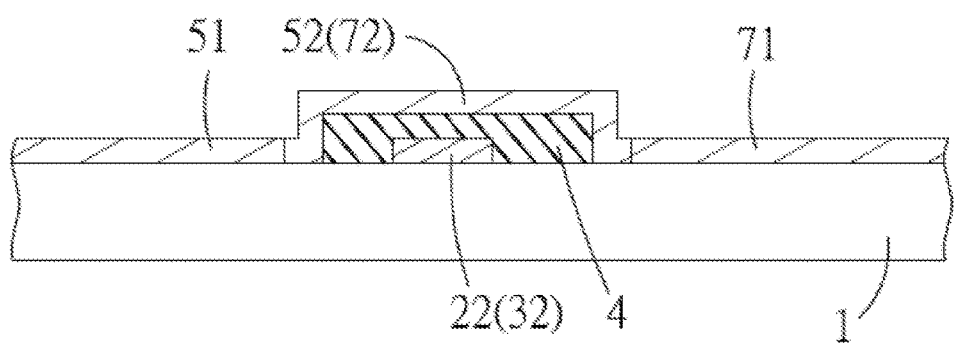
FIG. 14 is fragmentarily cross-sectional view taken along, the line G-G shown in FIG. 13.
Figure 15:
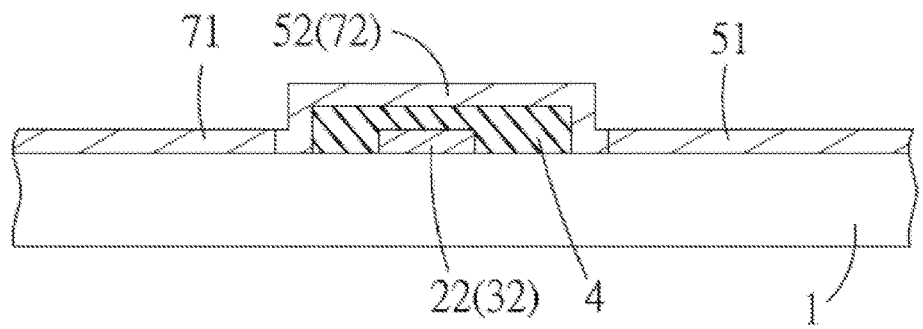
FIG. 15 is a fragmentarily cross-sectional view taken along the line H-H shown in FIG. 13.

Referring to FIGS. 13, 14 and 15, the touch panel 100 in accordance with at least one embodiment of the disclosure is illustrated. The first touch sensor electrodes 2, the first pressure sensor electrodes 3, the second touch sensor electrodes 5, and the second pressure sensor electrodes 7 are slightly different from those of FIGS. 10, 11 and 12 in terms of structure but perform substantially the same functions.

Specifically, in some embodiments, the first touch-conducting sections 22 of each of the first touch sensor electrodes 2 are respectively connected to the first connection sections 32 of a corresponding one of the first pressure sensor electrodes 3, and the second connection sections 72 of each of the second touch sensor electrodes 5 are also respectively connected to the second touch-conducting sections 52 of a corresponding one the second pressure sensor electrodes 7. That is to say, it is not necessary to maintain electrical insulation between the first touch sensor electrodes 2 and the first pressure sensor electrodes 3 and between the second touch sensor electrodes 5 and the second pressure sensor electrodes 7. In some embodiments, the first connection sections 32 and the first touch-conducting sections 22 are, but are not limited to being, integrally formed, and the second connection sections 72 and the second touch-conducting sections 52 are, but are not limited to being, integrally formed.

Additionally, in some embodiments, each of the first insulation structures 4 (only one is shown) is located between two adjacent ones of the first touch-sensing sections 21 of the corresponding first touch sensor electrode 2 and the two adjacent first touch-sensing sections 21 are distributed in a staggered manner. Each of the first insulation structures 4 is located between two adjacent ones of the pressure-sensing sections 31 of the corresponding first pressure sensor electrode 3 and the two adjacent pressure-sensing sections 31 are distributed in a staggered manner. For example, the two adjacent pressure-sensing sections 31 are diagonally positioned with respect to each first insulation structure 4 so that the corresponding first pressure sensor electrode 3 is obliquely disposed with respect to the second direction. Each of the first insulation structures 4 is located between two adjacent ones of the second touch-sensing sections 51 of the corresponding second touch sensor electrode 5 and the two adjacent second touch-sensing sections 51 are distributed in a staggered manner. Each of the first insulation structures 4 is located between two adjacent ones of the second pressure-sensing sections 71 of the corresponding second pressure sensor electrode 7 and the two adjacent second pressure-sensing sections 71 are distributed in a staggered manner. The two adjacent second pressure-sensing sections 71 are diagonally positioned with respect to each first insulation structure 4 so that the corresponding second pressure sensor electrode 7 is obliquely disposed with respect to the first direction. Thus, the touch panel 100 of some embodiments can perform the same functions as FIGS. 10, 11 and 12 by means of a different structure.

Figure 16:
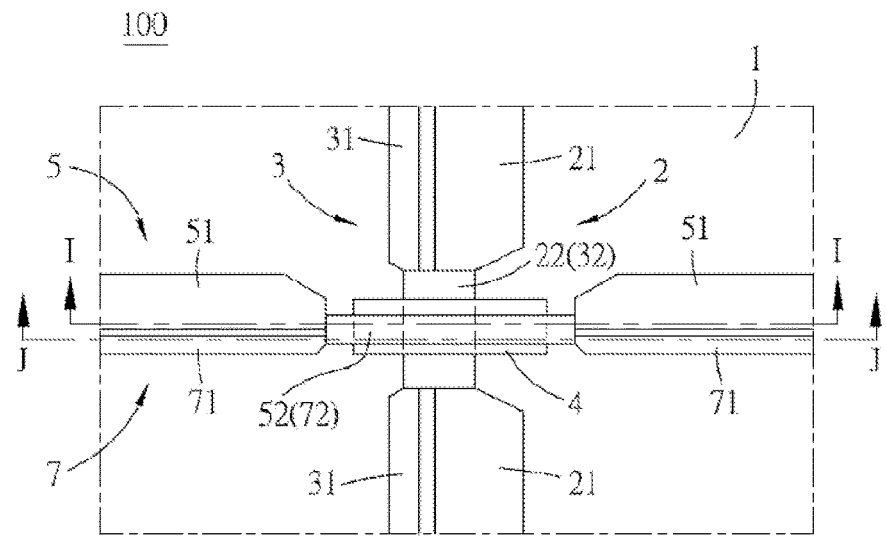
FIG. 16 is a front schematic view, illustrating some embodiments of a touch panel of the disclosure.
Figure 17:
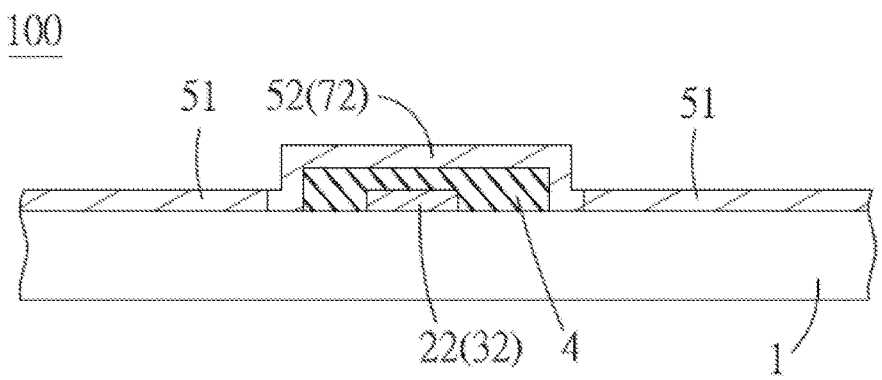
FIG. 17 is a fragmentarily cross-sectional view taken along the line I-I shown in FIGS. 13.
Figure 18:
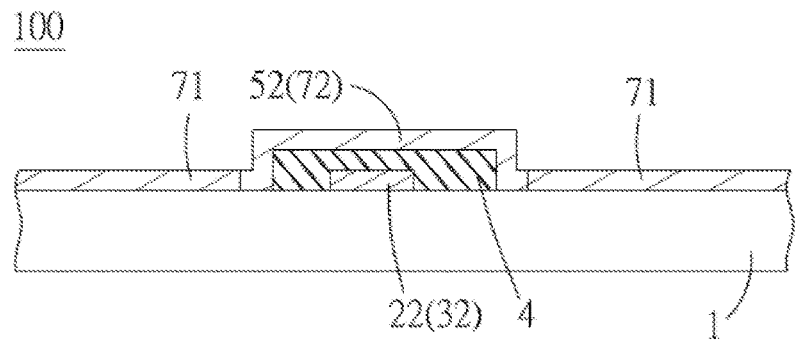
FIG. 18 is a fragmentarily cross-sectional view taken along the line J-J shown in FIG. 13.

Referring to FIGS. 16, 17 and 18, the touch panel 100 in accordance with at least one embodiment of the disclosure is illustrated. Compared with FIGS. 13, 14 and 15, the first touch-sensing sections 21, the pressure-sensing sections 31, the second touch-sensing sections 51, and the second pressure-sensing sections 71 in some embodiments are respectively and symmetrically distributed with respect to the first insulation structures 4. The touch panel 100 can perform the touch-sensing function and the pressure-sensing function the same as those of FIGS. 10 to 15 but with a different structure.

In view of the abovementioned embodiments, the first pressure sensor electrodes 3, the second pressure sensor electrodes 7, the first touch sensor electrodes 2 and the second touch sensor electrodes 5 of the touch panel 100 of the disclosure are disposed on the same surface of the substrate 1. Therefore, on the one hand, the substrate 1 is used in an economic way so as to reduce the entire thickness of the touch panel 100, while on the other hand, by virtue of placement of the first pressure sensor electrodes 3, the second pressure sensor electrodes 7, the first touch sensor electrodes 2 and the second touch sensor electrodes 5 on the same surface of the substrate 1, interference between touch-sensing performance and touch pressure value-sensing performance of the touch panel 100 is avoided, thereby assuring accuracy of touch sensing and pressure value sensing.

Furthermore, from the viewpoint of manufacturing process, the first and second pressure sensor electrodes 3, 7, and the first and second touch sensor electrodes 2, 5 are made from the same material, and thus the first and second pressure sensor electrodes 3, 7, and the first and second touch sensor electrodes 2, 5 are made in the same manufacturing step, thereby enhancing production efficiency and economy.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A touch panel, comprising:
a substrate;
a first touch sensor electrode disposed on a first surface of said substrate and extending in a first direction, wherein said first touch sensor electrode comprises a first touch-sensing section and a first touch-conducting section;
a first insulation structure disposed on said substrate and covering said first touch-conducting section;
a second touch sensor electrode disposed on said first surface of said substrate, wherein:
said second touch sensor electrode extends in a second direction and crosses over said first insulation structure and said first touch-conducting section, and
said second touch sensor electrode comprises a second touch-sensing section; and
a first pressure sensor electrode disposed on said first surface of said substrate, wherein:
said first pressure sensor electrode extends in a third direction,
said first pressure sensor electrode comprises a pressure-sensing section, and
said first touch-sensing section, said second touch-sensing section, and said pressure-sensing section each intersect a same plane extending parallel to the first surface.

2. The touch panel of claim 1, wherein:
said first direction is the same as said third direction,
said first touch sensor electrode and said first pressure sensor electrode are spaced-apart from each other in a parallel manner,
said first pressure sensor electrode comprises a first connection section,
said first insulation structure covers said first connection section, and
said second touch sensor electrode crosses over said first connection section.

3. The touch panel of claim 1, wherein:
said second direction is the same as said third direction,
said second touch sensor electrode and said first pressure sensor electrode are spaced-apart from each other in a parallel manner,
said first pressure sensor electrode comprises a first connection section, and
said first connection section crosses over said first insulation structure and said first touch-conducting section.

4. The touch panel of claim 1, wherein:
said third direction is oblique with respect to said first direction and said second direction,
said touch panel further comprises a second insulation structure being in a position to be superimposed with said first insulation structure,
said first touch sensor electrode and said first pressure sensor electrode sandwich said first insulation structure therebetween,
said first touch sensor electrode is electrically insulated from said first pressure sensor electrode by said first insulation structure,
said first pressure sensor electrode and said second touch sensor electrode sandwich said second insulation structure therebetween, and
said first pressure sensor electrode is electrically insulated from said second touch sensor electrode by said second insulation structure.

5. The touch panel of claim 1, further comprising:
a second pressure sensor electrode disposed on said first surface of said substrate and extending in a fourth direction, wherein:
said second pressure sensor electrode electrically insulated from said first pressure sensor electrode by said first insulation structure, and
said second pressure sensor electrode crosses over said first touch-conducting section and said first pressure sensor electrode.

6. The touch panel of claim 5, wherein:
said first direction is the same as said third direction,
said second direction is the same as said fourth direction,
said first pressure sensor electrode comprises a first connection section,
said first insulation structure covers said first connection section, and
said second pressure sensor electrode crosses over said first connection section.

7. The touch panel of claim 6, wherein:
said first touch sensor electrode comprises a plurality of spaced-apart first touch-sensing sections, including said first touch-sensing section, and a plurality of first touch-conducting sections, including said first touch-conducting section, that are respectively connected among said plurality of first touch-sensing sections,
said first pressure sensor electrode comprises a plurality of spaced-apart pressure-sensing sections, including said pressure-sensing section, and a plurality of first connection sections, including said first connection section, that are respectively connected among said plurality of pressure-sensing sections,
said first insulation structure covers each of said plurality of first connection sections,
said first connection section is connected to said first touch-conducting section,
said second touch sensor electrode comprises a plurality of spaced-apart second touch-sensing sections, including said second touch-sensing section, and a plurality of second touch-conducting sections that are respectively connected among said plurality of second touch-sensing sections,
a second touch-conducting section of said plurality of second touch-conducting sections is superimposed with said first insulation structure,
said second pressure sensor electrode comprises a plurality of spaced-apart second pressure-sensing sections and a plurality of second connection sections that are respectively connected among said plurality of second pressure-sensing sections, and
a second connection section of said plurality of second connection sections is superimposed with said first insulation structure and is connected to said second touch-conducting section.

8. The touch panel of claim 7, wherein:
each of said plurality of first connection sections and a corresponding one of said plurality of first touch-conducting sections is integrally formed, and
each of said plurality of second connection sections and a corresponding one of said plurality of second touch-conducting sections is integrally formed.

9. The touch panel of claim 7, wherein:
said first insulation structure is located between two adjacent ones of said plurality of first touch-sensing sections,
said first insulation structure being located between two adjacent ones of said plurality of pressure-sensing sections, and
said first insulation structure being located between two adjacent ones of said plurality of second touch-sensing sections.

10. The touch panel of claim 7, wherein said plurality of first touch-sensing sections, said plurality of pressure-sensing sections, said plurality of second touch-sensing sections, and said plurality of second pressure-sensing sections are respectively and symmetrically distributed with respect to said first insulation structure.

11. The touch panel of claim 5, wherein said first pressure sensor electrode and said second pressure sensor electrode have a width ranging from about 20 to about 200 nanometers.

12. The touch panel of claim 1, wherein said first touch sensor electrode and said second touch sensor electrode have a width ranging from about 300 to about 1000 nanometers.

13. The touch panel of claim 1, wherein said first touch sensor electrode, said second touch sensor electrode and said first pressure sensor electrode are made from the same material.

14. The touch panel of claim 1, wherein said first pressure sensor electrode has resistance greater than that of said first touch sensor electrode and said second touch sensor electrode.

15. A touch panel, comprising:
a substrate;
a first touch sensor electrode disposed on said substrate and extending in a first direction;
a first insulation structure disposed on said substrate and covering a part of said first touch sensor electrode;
a second touch sensor electrode disposed on said substrate and extending in a second direction, wherein:
said second touch sensor electrode crosses over said first insulation structure and said first touch sensor electrode, and
said second touch sensor electrode is staggered with said first touch sensor electrode in an electrically insulating manner;
a first pressure sensor electrode disposed on said substrate and extending in a third direction, wherein:
said first pressure sensor electrode crosses over said first insulation structure,
said first pressure sensor electrode is staggered with at least one of said first touch sensor electrode or said second touch sensor electrode, and
said third direction is oblique with respect to said first direction and said second direction; and
a second insulation structure being in a position to be superimposed with said first insulation structure and spaced-apart from said first insulation structure, wherein:
said first touch sensor electrode and said first pressure sensor electrode sandwich said first insulation structure therebetween,
said first touch sensor electrode is electrically insulated from said first pressure sensor electrode by said first insulation structure,
said first pressure sensor electrode and said second touch sensor electrode sandwich said second insulation structure therebetween, and
said first pressure sensor electrode is electrically insulated from said second touch sensor electrode by said second insulation structure.

16. The touch panel of claim 15, wherein said first touch sensor electrode, said second touch sensor electrode and said first pressure sensor electrode are made from the same material.

17. The touch panel of claim 15, wherein a width of said first pressure sensor electrode is less than a width of said first touch sensor electrode and a width of said second touch sensor electrode.

18. The touch panel of claim 15, wherein said first pressure sensor electrode has resistance greater than that of said first touch sensor electrode and said second touch sensor electrode.

19. A touch panel, comprising:
a substrate;
a first touch sensor electrode disposed on said substrate and extending in a first direction;
a first insulation structure disposed on said substrate and covering a part of said first touch sensor electrode;
a second touch sensor electrode disposed on said substrate and extending in a second direction, wherein:

said second touch sensor electrode crosses over said first insulation structure and said first touch sensor electrode, and said second touch sensor electrode is staggered with said first touch sensor electrode in an electrically insulating manner;

a first pressure sensor electrode disposed on said substrate and extending in a third direction, wherein:

said first pressure sensor electrode crosses over said first insulation structure, and said first pressure sensor electrode is staggered with at least one of said first touch sensor electrode or said second touch sensor electrode; and a second pressure sensor electrode disposed on said substrate and extending in a fourth direction, wherein:

said second pressure sensor electrode is staggered with said first pressure sensor electrode and electrically insulated from said first pressure sensor electrode through said first insulation structure, and said second pressure sensor electrode is staggered with at least one of said first touch sensor electrode or and said second touch sensor electrode.

20. The touch panel of claim 19, wherein:
said first direction is the same as said third direction,
said second direction is the same as said fourth direction.

* * * * *